Dec. 9, 1947.   W. MILLER ET AL   2,432,483
LATCH OPERATED AXIALLY ENGAGING POSITIVE CLUTCH
Filed April 1, 1946
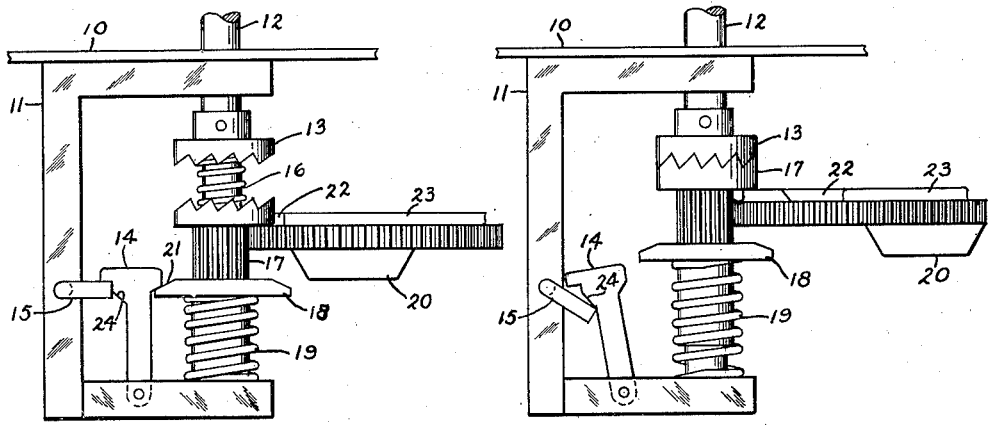
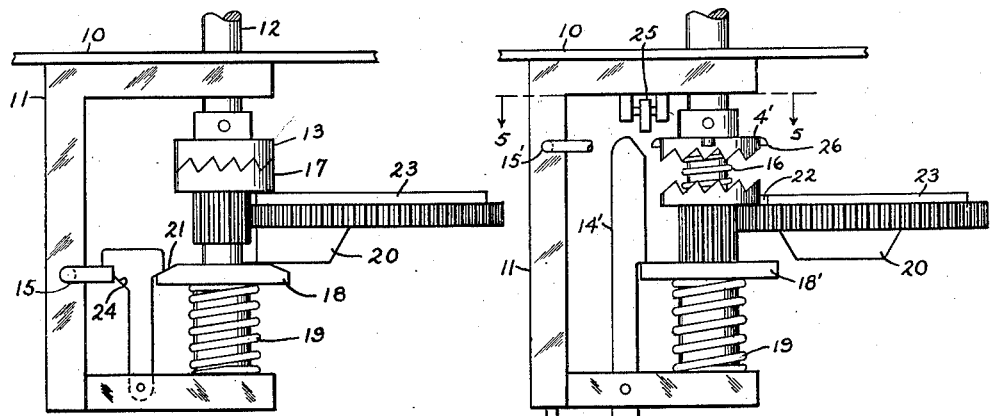
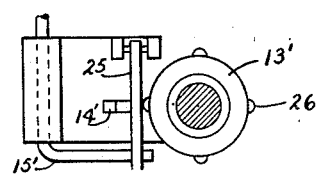
INVENTOR.
WALTER MILLER
JAMES L. D. MORRISON
BY
Fred C. Geiger Patented Dec. 9, 1947

2,432,483

UNITED STATES PATENT OFFICE 2,432,483

LATCH OPERATED AXIALLY ENGAGING POSITIVE CLUTCH

Walter Miller and James L. D. Morrison, Benton Harbor, Mich.

Application April 1, 1946, Serial No. 658,765

3 Claims. (Cl. 192—24)

1

This invention relates to clutch mechanisms for record changers and the like, with means driven thereby for setting a cycle of operations in motion and releasing the clutch at the end thereof, automatically locking it in released position until a repetition of the cycle of operations is desired. The power may be obtained from any continuously turning shaft to which the clutch is connected for driving said means.

In the devices herein disclosed as illustrative of the present invention, the continuously turning shaft is the spindle of a turntable for records and the clutch may be utilized to operate record changer mechanism.

The object of this invention is to construct a clutch mechanism comprising a normally disengaged clutch with resilient means for engaging it, trigger means for cocking and holding said resilient means against urging said clutch into engagement, and means for actuating said trigger means to release said resilient means so as to cause the clutch to engage.

Another object of the present invention is to make a clutch mechanism which automatically disengages the clutch during operation and having manual means for placing it in engagement.

A further object of the present invention is to provide a resiliently engaged clutch with means driven thereby for automatically disengaging the clutch and locking it in disengaged position, and manual means for releasing said locking means to cause the clutch to engage.

A still further object of the present invention is to provide a drive shaft with clutch means for driving a mechanism thru a cycle of operations and then disengaging said clutch until it is again desired to drive the mechanism, and manual means for then reengaging the clutch to repeat the cycle.

Other and more specific objects will appear in the following detailed description of the devices disclosed, having reference to the accompanying drawing wherein:

Figures 1 to 3 show three phases of operation of one form of device illustrating the present invention, and Figures 4 and 5 show a modification of the holding and release means, wherein power from the drive shaft is utilized to assist in releasing the holding means.

In the form illustrated in Figures 1 to 3, the turntable 10, only partially shown, has a spindle 12 rotatably driven in bearings mounted in the frame 11. The spindle 12 is provided with a clutch comprising the driving jaw member 13

2 fixed thereto, and a slidable driven jaw member 17 having a pinion formed integrally therewith. A light spring 16 may be provided between the jaw members to ensure disengagement of the jaw members whenever the slidable member is allowed to drop out of engagement.

A slidable collar 18 having a bevelled edge 21 is resiliently urged upwardly by a stronger spring 19 against the driven jaw member, when released, so as to bring the jaw members together in driving relation. A trigger mechanism comprising a cam lever 14 having a shoulder for engaging the bevelled edge 21 of the collar 18 in the lowered position of said collar so as to hold spring 19 compressed, and a wedging slope 24 on the opposite side terminating in a notch for seating the end of a lever 15, is pivotally mounted at its lower end in the frame 11. Thus when the collar 18 is forced down to compress the spring 19, turning the lever 15 up will move the shoulder of the cam over the edge of the collar by reaction of the end of the lever 15 on the wedging slope 24 until the end of lever 15 moves into the notch.

The lever 15 is manually operated in its downward turning movement and may be urged upwardly by a spring (not shown), to automatically engage the cam lever 14 with the collar 18 as soon as the latter is brought down low enough. The bevel 21 is at such an angle as to render operation of the trigger easy, as the lever 15 is turned down as shown in Figure 2.

The pinion on jaw member 17 is meshed with a driven gear which has a cam 20 for forcing the collar 18 downwardly at the proper time in the cycle of operations, as shown in Figure 3, whereupon the trigger mechanism may engage and hold the collar in its downward position until released manually by lever 15, whenever it may be desired to repeat the cycle of operations. The gear is provided on its upper surface with a restraining annular ridge 23 for positively holding the clutch in engagement for a short period after the collar 18 has been forced down, until a groove 22 in the ridge comes under the shoulder of the driven jaw member 17 to permit this member to drop out of engagement with the driving jaw member 13. Member 17 then drops either by gravity alone or is assisted in the drop by spring 16, and rests on collar 18, whereupon operation of the clutch and therefore the gear ceases, until the lever 15 is again moved downwardly to release the trip mechanism and the collar. The operation then is repeated as already explained. Thus the device provides for cyclic operation. The lever 15 may be operated either by hand or mechanically by periodic control, as in a record changer mechanism, upon the completion of the playing of a record.

In Figures 4 and 5 a modified form of the device is shown wherein the trigger mechanism comprises a cam lever 16' having a square shoulder normally held over the edge of the collar 18' by a light spring 27 and having an extended portion adjacent the periphery of the driving jaw member 13' which is provided with cam lobes 26. A lever 25 loosely pivoted in the frame 11 is allowed to wedge between this extended portion and the periphery referred to above so that the cam lobes 26 will push it sideways sufficiently to move the cam lever shoulder off the edge of the ring 18'. A lever 14' normally holds the lever 25 up to prevent this release until the lever 15' is turned downwardly to allow the lever 25 to perform the releasing action. This device otherwise operates like form shown in Figures 1 to 3, as already described.

The present devices are novel, simple and very effective. Due to the level 21 in the first form and the wedging lever 25 operated by the lobes 26 in the second form, the release is very sensitive and does not require much force for its actuation.

Other obvious modifications in the form and arrangement of parts in the combinations herein described may be made without departing from the spirit and scope of this invention, as defined in the appended claims.

What we claim is:

1. A clutch mounted on a shaft, a collar freely mounted on said shaft, resilient means for urging said collar to place the clutch in engaged position, means for cocking and holding said collar against said resilient means to prevent engagement of said clutch, a trigger for releasing said collar to engage said clutch, and means driven by said clutch for periodically operating said cocking and holding means.

2. A clutch mounted on a drive shaft having a driving jaw member fixed thereto and a cooperating driven jaw member slidably mounted thereon and normally held separated from said driving jaw member in clutch release position, an axial coil spring around said shaft for urging said driven member against said driving member to engage the clutch, a thrust collar mounted freely around said shaft between said spring and said driven member, means for automatically releasably locking said collar in spring compressed position away from said driven member, and a trigger lever for releasing said locking means.

3. A clutch mounted on a drive shaft having a driving jaw member fixed thereto and a cooperating driven jaw member slidably mounted thereon and normally held separated from said driving jaw member in clutch release position, an axial coil spring around said shaft for urging said driven member against said driving member to engage the clutch, a thrust collar mounted freely around said shaft between said spring and said driven member, means for automatically releasably locking said collar in spring compressed position away from said driven member, a trigger lever for releasing said locking means, said driven member having a pinion gear formed integrally therewith, a gear driven by said pinion, a cam on said gear for positively holding said driven member in clutch engaged position after said locking means are released by said trigger lever and operation of the pinion starts as a result of the clutch engagement, a second cam on said gear for pushing said collar against said spring away from said driven member sufficiently to actuate said automatic locking means, said first cam then, after a predetermined cycle of operations performed thru said gear, releasing said driven member to release the clutch until the trigger lever is again actuated to start operating said gear for another cycle.

WALTER MILLER.
JAMES L. D. MORRISON.

REFERENCES CITED

The following references are of record in the file of this patent:

UNITED STATES PATENTS

| Number | Name | Date |
| --- | --- | --- |
| 2,260,416 | Wentworth et al. | Oct. 28, 1941 |
| 2,271,359 | Zeruneith | Jan. 27, 1942 |